(12) United States Patent
Cuddeback et al.

(10) Patent No.: US 7,066,662 B2
(45) Date of Patent: *Jun. 27, 2006

(54) ENCLOSURE FOR WILDLIFE SURVEILLANCE SYSTEM AND SECURITY APPARATUS THEREFOR

(75) Inventors: Mark J. Cuddeback, Green Bay, WI (US); Steven S. Heinold, Woodland Hills, CA (US)

(73) Assignee: Non Typical, Inc., Park Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/756,742

(22) Filed: Jan. 13, 2004

(65) Prior Publication Data

US 2004/0165873 A1    Aug. 26, 2004

Related U.S. Application Data

(63) Continuation of application No. 10/237,642, filed on Sep. 9, 2002, now Pat. No. 6,744,980, which is a continuation-in-part of application No. 09/906,409, filed on Jul. 16, 2001, now Pat. No. 6,449,431.

(60) Provisional application No. 60/261,944, filed on Jan. 16, 2001.

(51) Int. Cl.
*G03B 17/00*    (2006.01)
*G03B 17/08*    (2006.01)

(52) U.S. Cl. ........................................ 396/427; 396/25
(58) Field of Classification Search ............ 396/25–29, 396/155, 427
See application file for complete search history.

(56) References Cited

U.S. PATENT DOCUMENTS

| 4,918,472 | A | * | 4/1990 | Reed ........................... 396/28 |
| 5,128,548 | A | | 7/1992 | Goodson et al. |
| 5,517,201 | A | | 5/1996 | Thompson, Jr. |
| 6,449,431 | B1 | * | 9/2002 | Cuddeback et al. .......... 396/27 |
| 6,744,980 | B1 | * | 6/2004 | Cuddeback et al. .......... 396/25 |

* cited by examiner

*Primary Examiner*—Christopher Mahoney
(74) *Attorney, Agent, or Firm*—Boyle Fredrickson Newholm Stein & Gratz S.C.

(57) ABSTRACT

An enclosure for a wildlife surveillance system includes a base configured to support at least a portion of the surveillance system, and a cover coupled to the base. In addition, the enclosure includes a means for minimizing light generated by the surveillance system within the enclosure from interacting with the surveillance system. The means can be a foam insert disposed intermediate the surveillance system and an inside surface of the cover to minimize light reflected from the inside surface from interacting with the surveillance system. The enclosure can also include a cable having first and second opposed ends, and the base includes at least one cavity supported by the base and configured to receive at least one of the first and second opposed ends of the cable.

21 Claims, 5 Drawing Sheets

ENCLOSURE FOR WILDLIFE SURVEILLANCE SYSTEM AND SECURITY APPARATUS THEREFOR

CROSS REFERENCE TO RELATED APPLICATION

This application is a continuation application of Ser. No. 10/237,642, filed Sep. 9, 2002, now U.S. Pat. No. 6,744,980, which is a continuation-in-part application of Ser. No. 09/906,409, filed Jul. 16, 2001, now U.S. Pat. No. 6,449,431, which claims priority to Ser. No. 60/261,944 (provisional) filed on Jan. 16, 2001, each entitled "Enclosure for Wildlife Surveillance System and Security Apparatus Therefore," and each of which is expressly incorporated herein by reference.

BACKGROUND OF THE INVENTION

1. Field of the Invention

The present invention relates to apparatus for scouting potential hunting areas and determining game patterns, and more particularly, enclosures for wildlife cameras including security apparatus therefore.

2. Description of the Related Art

Apparatus for scouting potential hunting areas and determining game patterns, particularly without disturbing animal activity, are generally well-known in the art. Typically, the apparatus includes a camera and a passive infrared sensor (e.g., a motion/heat sensor) that is adapted to sense movement, and in response, activate a camera focused on the area in which the sensor detects movement. Often times, these devices include a delay timer with multiple settings to match specific conditions or locations, thus eliminating multiple exposures. Moreover, such apparatus preferably includes high/low sensitivity settings to allow adjustment of the camera's effective range in order to photograph game at any distance up to, for example, sixty (60) feet.

In addition, such systems are typically mounted in an enclosure that is adapted to be strapped to, for example, a tree. Because the components of the surveillance apparatus must periodically be accessed (e.g., to change film), the enclosure is typically designed for ready entry to its interior. For example, a door may be included to provide access its interior. Moreover, the enclosure typically includes openings or windows to accommodate, for example, a view path for the camera and sensor of the apparatus. Also, all the components are preferably sealed in the enclosure to protect the components from the environment.

To make its appearance inconspicuous, the enclosure is typically appropriately colored/contoured to camouflage the unit. Because the surveillance apparatus is often times left out in the woods for extended periods of time, the camouflage not only hides the unit from unsuspecting game, it also helps to prevent theft of the apparatus. Nevertheless, even if camouflaged, security is a concern.

Most known units typically also include a latch and locking mechanism, thus making it difficult to break into the enclosure which houses the expensive surveillance apparatus, including the sensor, camera and electronics. However, known systems do not effectively address the problem of theft of the entire apparatus from where it is mounted. Although the camouflage look of the enclosures, in conjunction with the enclosure locking mechanisms, is often times sufficient to avoid theft of the units, that is not always the case.

Therefore, the art of wildlife surveillance systems was in need of an enclosure having a ready, easy-to-use locking mechanism for ensuring the security of the relatively expensive components of the surveillance system. The apparatus should ensure the security of both the unit as a whole, including the enclosure which is strapped to the tree, and the contents of the enclosure. Moreover, the system should not compromise the integrity of the waterproof/insect-proof nature of the enclosure, and should not be a burden on the user when opening the enclosure so that the interior of the enclosure can be readily accessed for changing film, altering operational features, and the like.

SUMMARY OF THE INVENTION

According to one aspect of the preferred embodiment, an enclosure for a wildlife surveillance system includes a base configured to house the surveillance system, and a cover coupled to the base. In addition, the enclosure includes a locking assembly that secures the enclosure to a mounting structure. The locking assembly prevents removal of the enclosure from the mounting structure without opening the cover of the enclosure. The enclosure also includes a cable having first and second opposed ends, and the base includes at least one cavity supported by the base and configured to receive at least one of the first and second opposed ends of the cable.

According to another aspect of the preferred embodiment, the base includes a slit configured to allow a tab extending from a backside of the cover to engage the slit. In addition, the tab preferably includes a hole configured to receive a padlock.

According to a further aspect of this embodiment, the base includes a pair of side plates extending from the base and spaced on either side of the slit to allow a padlock to fit between the side plates, yet prevent access to the lock.

According to yet another aspect of this embodiment, the locking assembly includes an eye hook configured to receive at least one of the opposed ends of the cable, the eye hook having an eye extending from the backside of the base and having a threaded end, opposite the eye, projecting into the enclosure. In addition, the locking assembly includes a wing nut configured to tighten the eye hook onto the cable.

In a still further aspect of this preferred embodiment, the locking assembly includes a U-hook and a nut, the U-hook having a lip and an opposed threaded end, and wherein the base includes a notch extending into the enclosure and configured to accommodate the lip when the nut is tightened on the U-hook so as to secure the cable to the enclosure.

According to another aspect of the preferred embodiment, a locking assembly for an enclosure is provided. The enclosure houses a wildlife surveillance system that is coupled to a mounting structure and includes a base and a cover coupled to one another. The locking assembly includes a tab projecting from the cove, and includes a slit on the base that allows a tab to project through the slit. The locking assembly also employs a cable having opposed first and second ends adapted to be wrapped around a mounting structure such as a tree, and a means for attaching the cable to the enclosure.

In another aspect of this embodiment, the attaching means includes a cavity supported by the base, wherein the cavity is configured to receive at least one of the first and second opposed ends of the cable. In this case, the locking assembly also includes a device to tighten the cable to the enclosure.

According to another aspect of this embodiment, the cavity is defined by an eye hook configured to receive at least one of the opposed ends of the cable, the eye hook including an eye extending from the back side of the base and having an opposed threaded end projecting within the enclosure. In addition, the locking assembly includes a wing nut configured to tighten the eye hook onto the cable.

According to yet another aspect of the preferred embodiment, a method of securing a wildlife surveillance system to a mounting structure includes the step of providing an enclosure having a base and a cover. In this case, the cover has a tab with a hole in it configured to receive a padlock and the base has a slit configured to allow the tab to project through the slit. Moreover, the base includes side plates that surround the slit to prevent access to the lock of the padlock. The method also includes the step of providing a locking assembly that secures the enclosure to the mounting structure. The locking assembly secures the enclosure to the mounting structure such that the enclosure cannot be removed from the mounting structure without opening the cover.

According to another aspect of this embodiment, the locking assembly includes a cable having opposed first and second ends, and the base supports a cavity configured to receive at least one of the opposed ends of the cable. In addition, the securing step includes mating at least one opposed end of the cable with the cavity and pinching the cable within the cavity.

According to another aspect of this invention, the cavity is defined by an eye hook having an eye projecting from the backside of the base and configured to receive the cable. In this case, the pinching step includes tightening a wing nut on the hook so that the eye pinches the cable.

In yet another aspect of this embodiment, the cavity is defined by an elongated tube support by the base and wherein the pinching step includes tightening a screw adapted to extend into the cavity to pinch the cable against an interior wall of the cavity.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1:
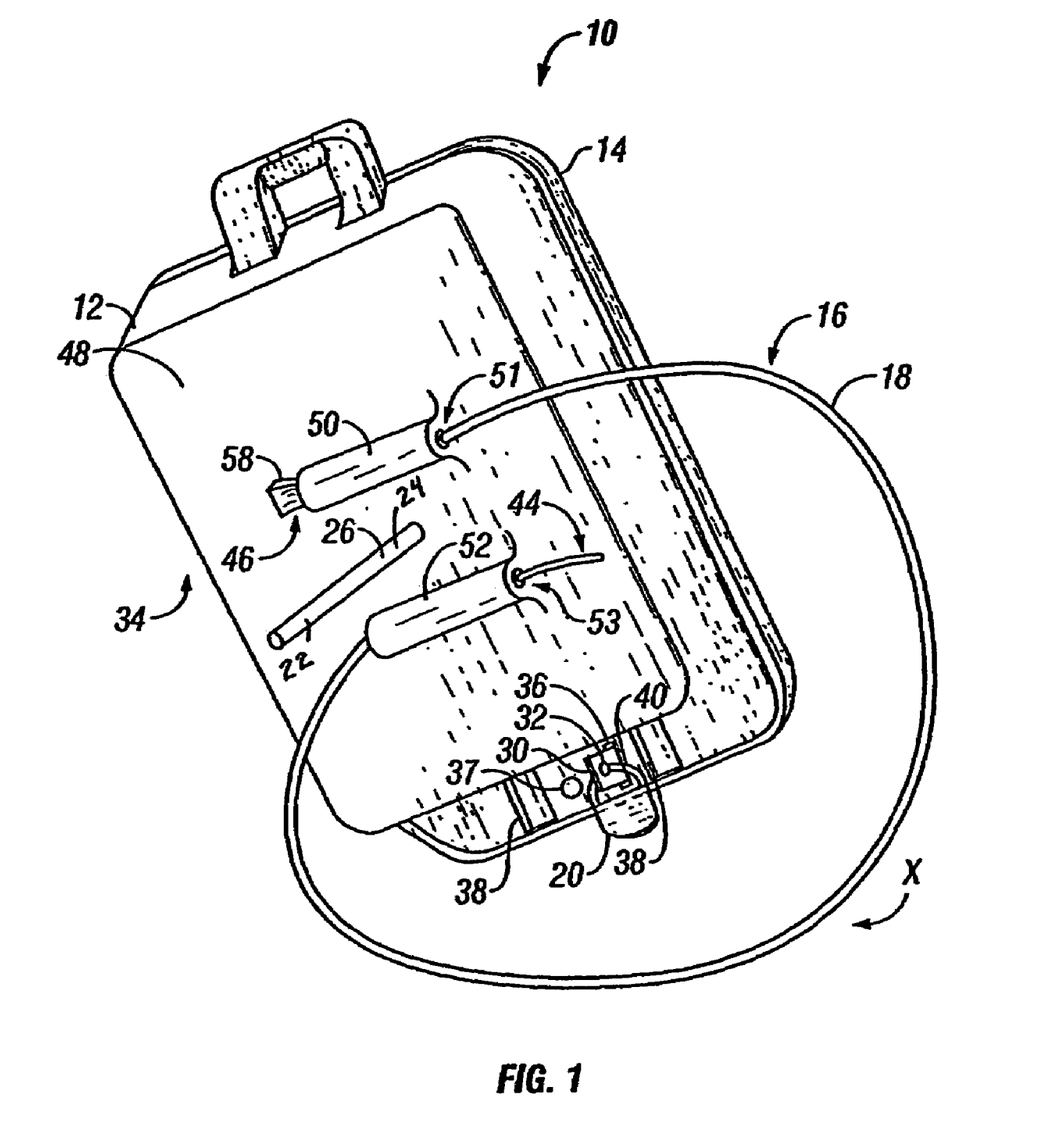
FIG. 1 is a perspective back view of the base of an enclosure for a wildlife surveillance assembly.
Figure 2:
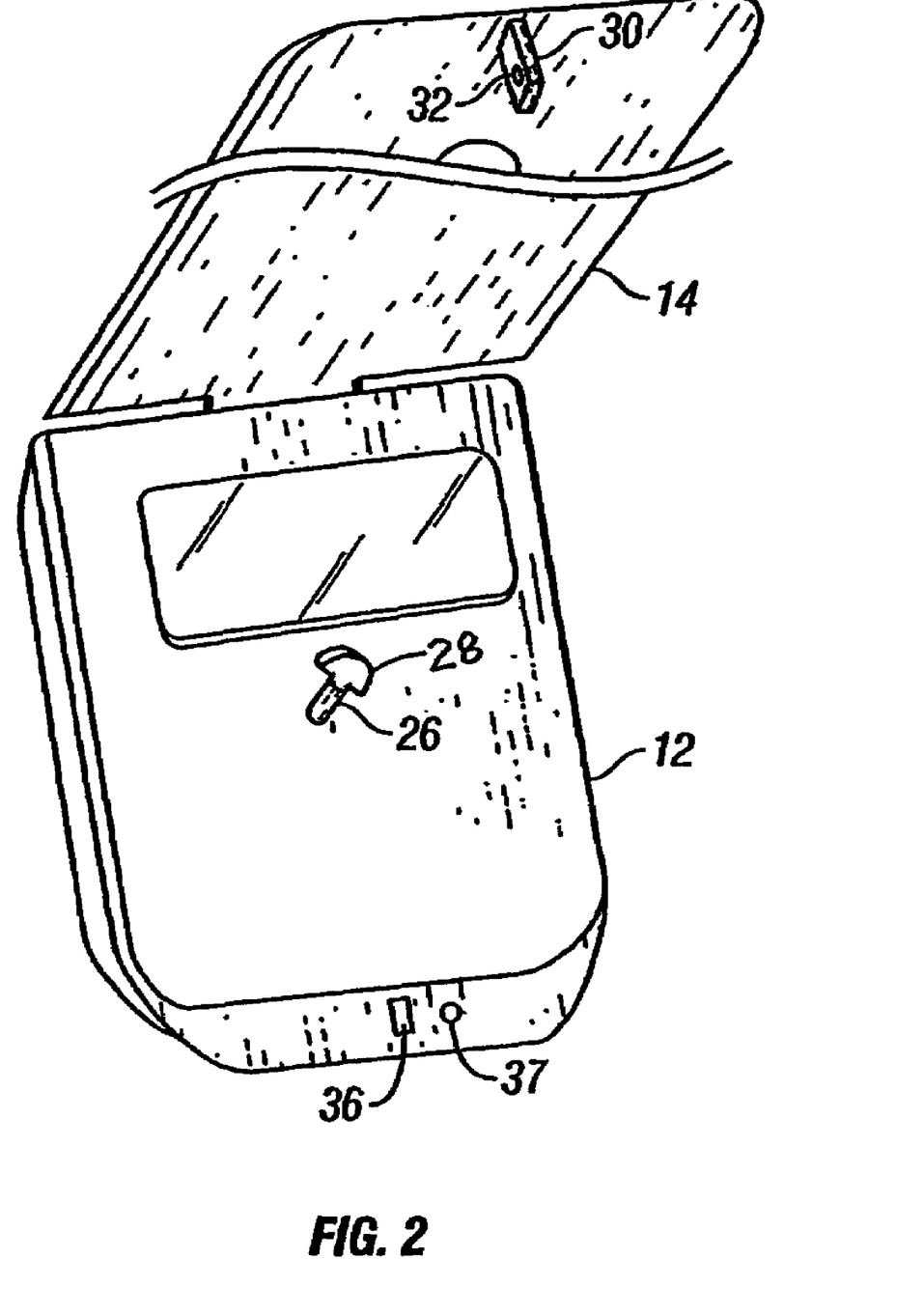
FIG. 2 is a perspective front view of a base of an enclosure with the cover shown in phantom.

With initial reference to FIGS. 1 and 2, an improved security enclosure 10 for a wildlife surveillance system is shown. The security enclosure 10 includes a housing or base 12 and a cover 14 that environmentally seal the surveillance system therein. These components are configured to be coupled to a mounting structure (not shown), such as a tree. Base 12 houses surveillance system components such as the camera, sensor, electronics, and power supply.

Enclosure 10 further includes a locking assembly 16 which may include a cable 18, a padlock 20 and a fastener 22. Fastener 22 could be an oversized screw, bolt or other means that could be either drilled or pounded into the mounting structure. Base 12 includes an aperture 24 that is wide enough to allow body 26 of fastener 22 to pass through, yet narrow enough to prevent the oversized head 28 of fastener 22 to pass. Aperture 24 is insect and weather proof, and may also be threaded to receive and allow the passage of a screw-like fastener. Fastener 22 provides initial support and attachment of enclosure 10 to the mounting structure. More importantly, the fastener acts as a redundant security mechanism to prevent theft in the event that cable 18 is severed or otherwise removed. In particular, if the cable 18 is removed, the wildlife surveillance system will remain safely secured to the mounting structure because fastener 22 cannot be removed without opening enclosure 10. Access to the interior of enclosure 10 is prevented because, as discussed in further detail below, the design of enclosure 10 prevents access to the lock of the padlock that couples and locks cover 14 to base 12. In this case, removing the surveillance system will require destroying enclosure 10 or, for example, cutting down the tree.

With further reference to FIGS. 1 and 2, cover 14 includes a tab 30 projecting from its enclosed side. Tab 30 includes a hole 32 configured to receive a padlock 20. Base 12 includes a slit 36 configured to allow tab 30 to pass through slit 36 and project out the backside 34 of base 12 when the cover 14 is closed upon base 12. Preferably when enclosure 10 is closed, a padlock 20 is passed through hole 32 in tab 30 preventing access to the inside of the enclosure 10 under a weather and insect tight seal. Padlock 20 restricts the passage of tab 30 back through slit 36, thereby preventing the opening of enclosure 10.

Still referring to FIGS. 1 and 2, the back side 34 of base 12 includes a plurality of side plates 38 (e.g., a pair as shown) surrounding the area in which the cover tab 30 projects through slit 36 in base 12. Side plates 38 are strategically spaced at a distance which allows access to the padlock 20 for removal with a key or other legitimate means, yet prevents access to the lock 40 with the use of a bolt cutter or other means designed to forcibly remove the lock.

Figure 3:
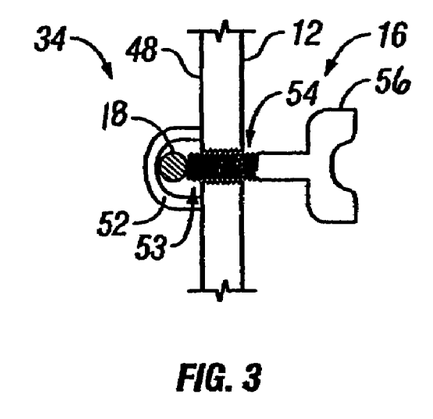
FIG. 3 is a partially broken away cross-sectional view of a preferred embodiment of the locking mechanism.

Referring next to FIGS. 1 and 3, a first preferred cable arrangement of locking assembly 16 is described. The cable 18 has opposed ends 44, 46 and has sufficient length to wrap around, for instance, a full-grown tree. Preferably, cable 18 is a vinyl coated aircraft cable 18, thus preventing the cable from being cut with a bolt cutter. The back side 34 of base 12 includes a support surface 48 that has tunnels or elongated tubes 50 and 52, preferably molded therewith, which define a corresponding pair of cavities 51 and 53. Tubes 50, 52 each has opposed open ends configured to receive opposed end 44 of cable 18. At about the location of lower cavity 53 of elongated tube 52, a threaded hole 54 is formed in support surface 48 of base 12. Threaded hole 54 is configured to allow the passage of a tip of screw 56 into cavity 53.

In particular, with continued reference to FIGS. 1 and 3, a first end of cable 18 is fed into first cavity 51 until an abutment 58 coupled to opposed end 46 of cable 18 and having a diameter larger than the diameter of the longitudinal opening of cavity 51 lies flush with one of the opposed ends of cavity 51. Abutment 58 prevents cable 18 from being pulled entirely through cavity 51. Cable 18 is then wrapped around the mounting structure in a direction marked "X," for instance, and the second opposed end 44 of cable 18 is placed in cavity 53 of tunnel 52, and pulled taut. A screw 56 is then screwed through the hole 54 in the inside of base 12 into cavity 53 and against cable 18, thus pinching and locking cable 18 within cavity 53. The pressure exerted by screw 56 secures cable 18 within cavity 53. Since the screw 56 is locked inside enclosure 10, cable 18 cannot be removed or loosened without access to the inside of enclosure 10 when locked. As a result, enclosure 10, and surveillance system therein, are securely locked to the tree. To remove enclosure 10, padlock 20 must first be removed, cover 14 opened and fastener 56 loosened. By doing so, cable 18 can be removed as well as fastener 22, and enclosure 10 can be removed from the mounting structure.

Figure 4:
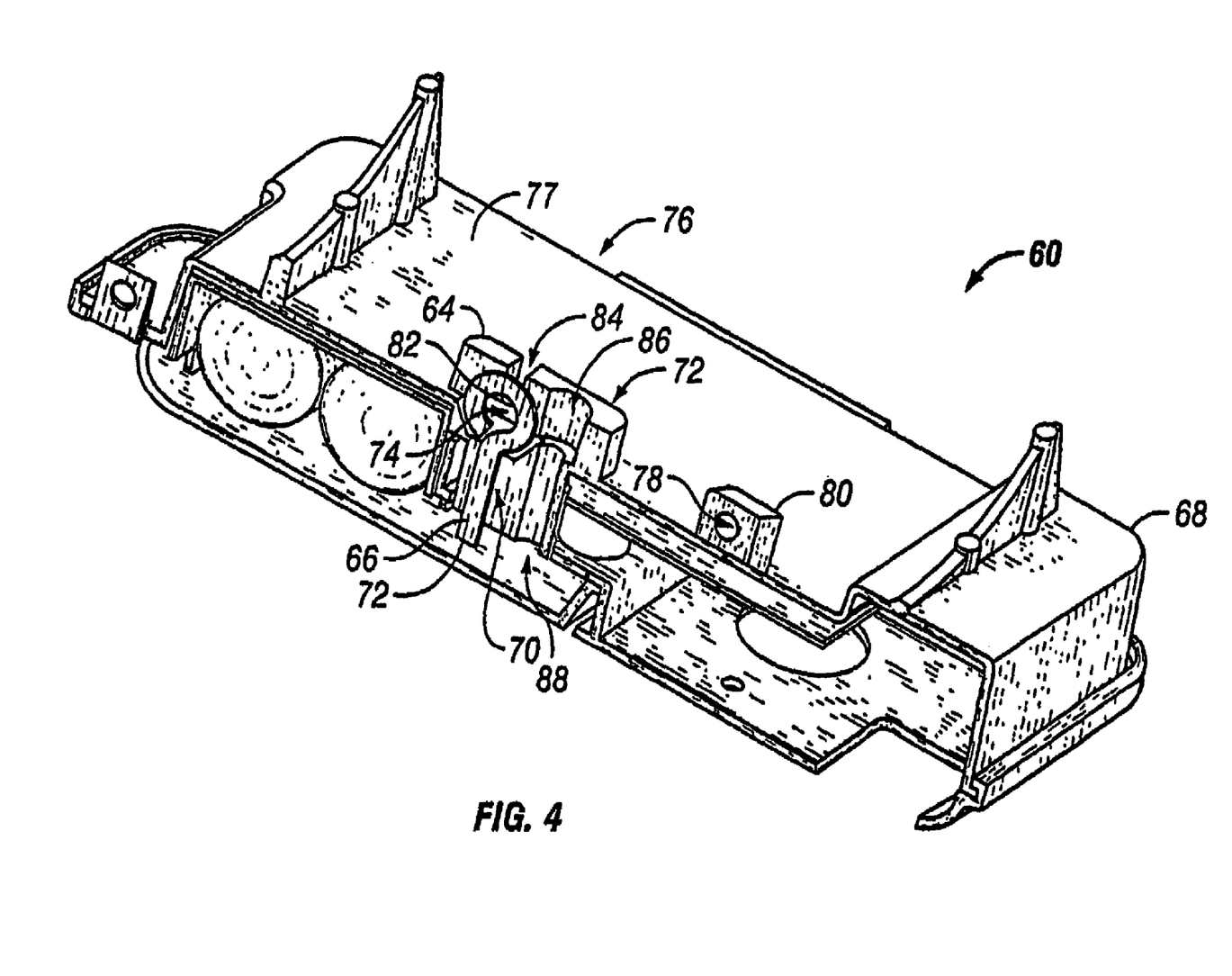
FIG. 4 is a partially broken away cross-sectional view of an alternative preferred embodiment of the locking mechanism.
Figure 5:
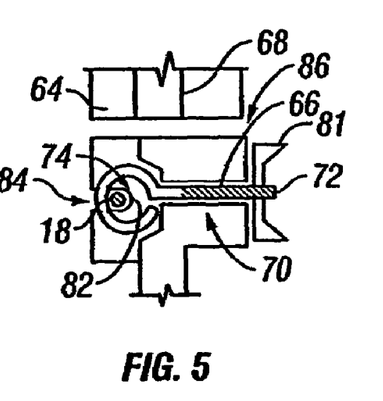
FIG. 5 is a partially broken away cross-sectional view of yet another alternative preferred embodiment of the locking mechanism.

Turning to FIGS. 4 and 5, a second preferred embodiment of the cable arrangement of an enclosure 60, an alternate locking assembly 62 is shown. In this case, the cavity in which the cable is locked (molded cavity 53 in FIG. 1) is defined by a support 64 and an eye hook 66. A cable 18 having opposed ends is provided that is of sufficient length to wrap around a full grown tree, as in the previous embodiment. The inside of a base 68 of enclosure 60 has a hole 70 configured to allow the passage of a threaded end 72 of the eye hook 66. Eye hook 66 is placed through base 68 in a manner that the eye 74 of eye hook 66 projects away from backside 76 of base 68 and the threaded end 72 of eye hook 66 projects into the inside of base 68. The eye hook 66 is configured to receive at least one of the opposed ends (e.g., 44, 46 in FIG. 1) of cable 18. Notably, support 64 may be either molded as part of base 68 or it may be attached to a support surface 77 of back side 76 of base 68, as with tunnels 50, 52 in FIG. 1. Support 64 may also include a channel 86 coaxial with an opening 88 formed in base 68. The passageway defined thereby is adapted to receive a fastener (such as 26 in FIG. 1) to secure the surveillance system to the mounting structure prior to securing the same with locking assembly 62, for example.

To secure base 68 to a mounting structure such as a tree, a first end 44 of cable 18 is fed into an opening or cavity 78 of a protrusion 80 (similar to elongated tubular structure 50 in FIG. 1). Cable 18 is pulled tight so abutment 58 is adjacent to one of the opposed ends of cavity 78, as in the previously described embodiment. Eye hook 66 is then securely tightened onto cable 18 through the tightening of a wing nut 81 located on the threaded end 72 of eye hook 66 within base 68 of enclosure 60. The pressure exerted by wing nut 81 as it is tightened pulls cable 18 against a wall as to squeeze and lock cable 18. Since wing nut 81 is locked inside of base 68 of enclosure 60 (with padlock 20 described previously), cable 18 cannot be removed or loosened without access to the inside of locked enclosure 60. Alternatively, protrusion 80 may be eliminated and both ends of cable 18 fed through the cavity defined by eye 74 of eye hook 66 and slot 84 of support 64. When tightened with wing nut 81, both ends (for example 44, 46 in FIG. 1) of cable 18 are pinched and locked generally against wall 82 of slot 84. In this case, cable 18 does not require an abutment 58 at opposed end 46.

Figure 6:
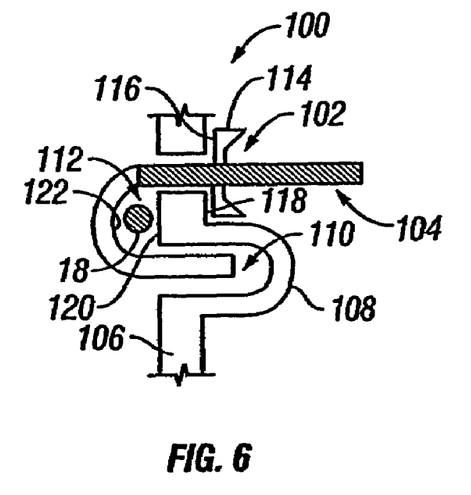
FIG. 6 is a partially broken away cross-sectional view of a further alternative preferred embodiment of the locking mechanism.

Referring next to FIG. 6, an alternative to locking assembly 62 including an eye hook 66, an enclosure 100 including a locking assembly 102 is shown. Locking assembly 102 functions in essentially the same manner as that described with respect to the embodiment shown and described in conjunction with FIGS. 4 and 5, however, in this case, eye hook 66 is replaced by a U-hook 104, and support 64 is removed. Enclosure 100 includes a base 106 that has a notch 108 formed therein to accommodate a lip 110 of U-hook 104 when cable 18 is tightened by locking assembly 102.

More particularly, to lock enclosure 100 to a mounting structure such as a tree, cable 18 is preferably fed through a cavity (such as 51 in FIG. 1), around the tree, and into an opening 112 defined by U-hook 104. Thereafter, a wing nut 114 is tightened on U-hook 104 until a surface 116 of wing nut 114 lies flush and tight with an inside surface 118 of base 106. As a result, cable 18 is squeezed tight between a back surface 120 of base 106 and an inside surface 122 of U-hook 104. Lip 110 remains enclosed in notch 108, thus preventing theft, for example, from prying away at U-hook 104 (or lock 40 of padlock 20) of locking assembly 102. Similar to the previous embodiments, tunnel (50 in FIG. 1) or support (80 in FIG. 4) is not required as both ends of cable 18 are fed through the cavity defined by U-hook 104. In this case, abutment 58 on opposed end 46 of cable 18 is not required as both ends 44, 46 are clamped by locking assembly 102.

Figure 7:
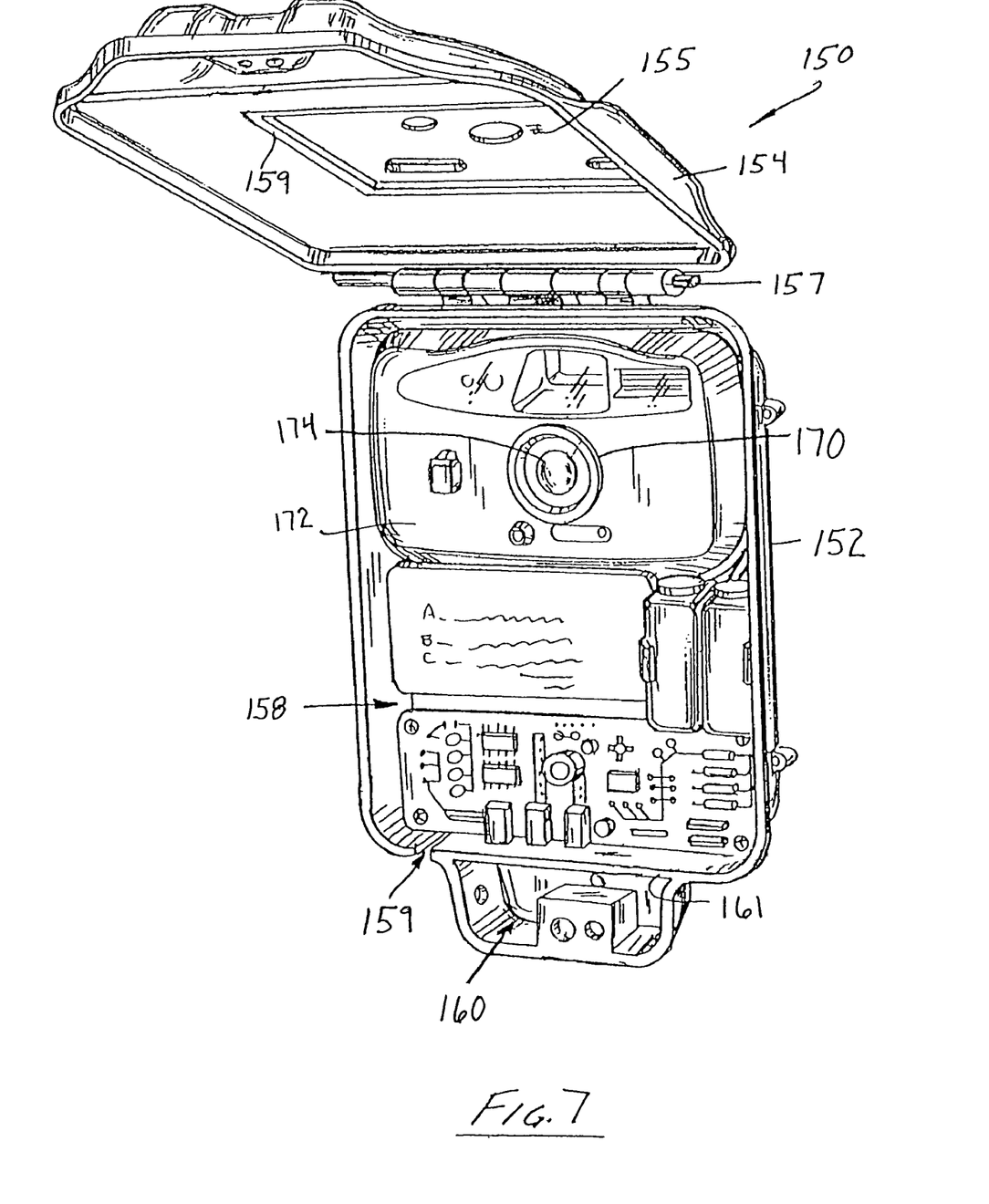
FIG. 7 is a perspective view illustrating the housing and cover of an enclosure in an open position, with the components of a surveillance assembly mounted therein.

With reference to FIG. 7, a housing 152 of enclosure 150 includes first and second compartments 158, 160, respectively, that are separated by a divider 161. Cover 154 is in an open position with the components of the surveillance system mounted in first compartment 158 of housing 152. Cover 154 may be maintained in the open position shown in FIG. 7 by slidably positioning pin 157 of the hinge 156. Further, the first compartment 158 of the housing includes an opening 159 to accommodate a toggle switch (not shown), for example, which may be adapted for controlling the operating modes of the surveillance system. Preferably, opening 159 and the toggle switch are sealed with, for example, a rubber gasket.

With further reference to FIG. 7, enclosure 150 preferably includes a foam ring or insert 170 disposed around a lens 174 of a camera 172 that is part of surveillance system. Ring 170 is positioned intermediate camera 172 and inside surface 155 of cover 154 and is sandwiched by cover 154 and camera 172 when cover 154 is closed. As a result, spurious light (e.g., from the camera flash) does not impinge upon lens 174 when the system is activated, for example, by movement of a deer, and thus the integrity of the scouting feature of the system is maintained. Notably, ring 170 may be coupled to camera 172 with an adhesive that allows removal/replacement of the ring. Further, a sheet of thin, high-grade plexi-glass (see, for example, 161 in FIG. 7), or the like may be coupled to inside surface 155 of cover 154 to provide a window and seal the contents of surveillance assembly from the environment. Preferably, an adhesive is used which allows ready removal/replacement of the window in the event the window gets scratched. etc, Note that, in this case, ring 170, if included, is sandwiched by the camera and the plexi-glass window when cover 152 is closed.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. An enclosure for a wildlife surveillance system, the enclosure comprising:
   a base configured to support at least a portion of the surveillance system;
   a cover coupled to the base with a hinge so as to permit rotating movement therebetween; and
   a foam insert disposed intermediate the surveillance system and an inside surface of said cover to minimize light reflected from the inside surface from interacting with the surveillance system.

2. The enclosure of claim 1, wherein both said base and said cover include a first pair of holes and a second pair of holes that are aligned with one another when the cover is in a closed position.

3. The enclosure of claim 2, wherein the first pair of holes are configured to accommodate a lock to lock the cover to the base.

4. The enclosure of claim 2, wherein the second pair of holes are threaded to accommodate a fastener to clamp the cover to the base.

5. The enclosure of claim 1, wherein the base further comprises first and second compartments and wherein said first and second compartments are environmentally isolated from one another.

6. The enclosure of claim 1, wherein said hinge further includes a pin and a plurality of adjacent female portions, said adjacent female portions being adapted to receive said pin, and wherein at least a portion of said pin and at least some of said adjacent female portions are configured to interlock so as to selectively prevent rotating movement of said cover relative to said base.

7. The enclosure of claim 1, further comprising a locking assembly that secures the enclosure to a mounting structure, said locking assembly preventing removal of the enclosure from said mounting structure without opening said cover of the enclosure,
   wherein said base includes first and second compartments environmentally isolated from one another, and wherein said locking assembly is coupled to said second compartment.

8. The enclosure of claim 1, further comprising a locking assembly that secures the enclosure to a mounting structure, said locking assembly preventing removal of the enclosure from said mounting structure without opening said cover of the enclosure,
   wherein said locking assembly includes:
   a flexible cable having opposed ends and having an abutment coupled to one of said ends;
   a collar slidably coupled to said flexible cable and adapted to be locked to said flexible cable at a desired position; and
   wherein said enclosure includes a plurality of openings through which said flexible cable is received.

9. The enclosure of claim 8, wherein said base includes first and second compartments environmentally isolated from one another, and wherein said plurality of openings are formed in one of said first and second compartments.

10. The enclosure of claim 1, wherein the surveillance system includes a camera with a flash, the flash being the source of the light.

11. An enclosure for a wildlife surveillance system, the enclosure comprising:
    a base configured to support at least a portion of the surveillance system;
    a cover coupled to the base with a hinge so as to permit rotating movement therebetween; and
    means for minimizing light generated by the surveillance system within the enclosure from interacting with the surveillance system.

12. The enclosure of claim 11, wherein the means for minimizing light generated by the surveillance system within the enclosure comprises a foam insert disposed intermediate the surveillance system and an inside surface of said cover to minimize light reflected from the inside surface from interacting with the surveillance system.

13. The enclosure of claim 11, further comprising a locking assembly that secures the enclosure to a mounting structure, said locking assembly preventing removal of the enclosure from said mounting structure without opening said cover of the enclosure.

14. The enclosure of claim 11, wherein the base further comprises first and second compartments and wherein said first and second compartments are environmentally isolated from one another.

15. The enclosure of claim 11, wherein said hinge further includes a pin and a plurality of adjacent female portions, said adjacent female portions being adapted to receive said pin, and wherein at least a portion of said pin and at least some of said adjacent female portions are configured to interlock so as to selectively prevent rotating movement of said cover relative to said base.

16. The enclosure of claim 11, further comprising a locking assembly that secures the enclosure to a mounting structure, said locking assembly preventing removal of the enclosure from said mounting structure without opening said cover of the enclosure,
    wherein said base includes first and second compartments environmentally isolated from one another, and wherein said locking assembly is coupled to said second compartment.

17. The enclosure of claim 11, further comprising a locking assembly that secures the enclosure to a mounting structure, said locking assembly preventing removal of the enclosure from said mounting structure without opening said cover of the enclosure,
    wherein said locking assembly includes:
    a flexible cable having opposed ends and having an abutment coupled to one of said ends;
    a collar slidably coupled to said flexible cable and adapted to be locked to said flexible cable at a desired position; and
    wherein said enclosure includes a plurality of openings through which said flexible cable is received.

18. A Method of minimizing light in a wildlife surveillance system, the method comprising the steps of:
    providing an enclosure having a base and a cover;
    disposing a foam insert intermediate the surveillance system and an inside surface of said cover; and
    minimizing light reflected from the inside surface from interacting with the surveillance system.

19. The method of claim 18, wherein the base has first and second compartments environmentally isolated from one another, and wherein one of the first and second compartments includes a plurality of openings;
    further comprising the steps of:
    providing a locking assembly; and
    securing the enclosure to a mounting structure by coupling the locking assembly to the openings such that the enclosure cannot be removed from the mounting structure without opening the cover.

20. The method of claim 19, wherein the locking assembly includes a flexible cable and a lock, and wherein the cover includes an opening adapted to align with one of the plurality of openings when the cover is closed on the base, and wherein said securing step includes mating the cable with others of the plurality of openings and locking the lock through the aligned openings of the cover and the base.

21. The method of claim 18, wherein the surveillance system includes a camera with a flash, the flash being the source of the light reflected from the inside surface.

* * * * *